United States Patent
Cooper et al.

(10) Patent No.: US 10,602,349 B2
(45) Date of Patent: Mar. 24, 2020

(54) SCALING MOBILE GATEWAYS IN A 3RD GENERATION PARTNERSHIP PROJECT (3GPP) NETWORK

(71) Applicant: Intel Corporation, Santa Clara, CA (US)

(72) Inventors: Jacob Alden Cooper, Hillsboro, OR (US); Karla Jean Saur, Portland, OR (US); Saikrishna Edupuganti, Hillsboro, OR (US); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/981,658

(22) Filed: May 16, 2018

(65) Prior Publication Data
US 2019/0045357 A1  Feb. 7, 2019

(51) Int. Cl.
| | |
|---|---|
| *H04W 8/26* | (2009.01) |
| *H04W 40/24* | (2009.01) |
| *H04W 28/08* | (2009.01) |
| *H04W 76/11* | (2018.01) |
| *H04L 12/723* | (2013.01) |
| *H04W 88/16* | (2009.01) |

(52) U.S. Cl.
CPC ............ *H04W 8/26* (2013.01); *H04L 45/50* (2013.01); *H04W 28/08* (2013.01); *H04W 40/246* (2013.01); *H04W 76/11* (2018.02); *H04W 88/16* (2013.01)

(58) Field of Classification Search
CPC ... H04W 28/08; H04W 40/246; H04W 76/11; H04W 88/16; H04W 8/26
See application file for complete search history.

(56) References Cited

U.S. PATENT DOCUMENTS

| | | | | |
|---|---|---|---|---|
| 8,520,615 | B2 * | 8/2013 | Mehta .................. | H04W 8/082 370/329 |
| 8,635,326 | B1 * | 1/2014 | Chaganti ................. | H04L 45/60 709/223 |
| 8,855,071 | B1 * | 10/2014 | Sankaran .............. | H04W 76/11 370/329 |
| 9,622,143 | B1 * | 4/2017 | Sankaran .............. | H04W 40/02 |
| 2011/0075557 | A1 * | 3/2011 | Chowdhury ............ | H04L 12/14 370/230 |
| 2016/0204996 | A1 | 7/2016 | Lindgren et al. | |
| 2016/0337270 | A1 | 11/2016 | Heinonen et al. | |
| 2016/0352623 | A1 | 12/2016 | Jayabalan et al. | |

(Continued)

FOREIGN PATENT DOCUMENTS

| | | |
|---|---|---|
| EP | 2843885 A1 | 3/2015 |
| WO | 2018001538 A1 | 1/2018 |

*Primary Examiner* — Saad A. Waqas
(74) *Attorney, Agent, or Firm* — Patent Capital Group

(57) ABSTRACT

Particular embodiments described herein provide for a system that can be configured to initialize a gateway, assign a range of tunnel endpoint identifiers (TEID) to the gateway, where the range of TEIDs are associated with the gateway, and communicate the range of TEIDs to routers, where each TEID in the range of TEIDs is used to by the router to route packets to the gateway. In an example, the range of TEIDS associated with the gateway are assigned to the gateway when the gateway was initialized and the gateway assigns the TEID for the session.

25 Claims, 8 Drawing Sheets

(56) References Cited

U.S. PATENT DOCUMENTS

2017/0142613 A1\* 5/2017 Singh .................... H04W 28/08
2017/0251514 A1   8/2017 Soderlund et al.
2017/0347251 A1   11/2017 Kim et al.
2018/0206275 A1\* 7/2018 Jain ....................... H04W 40/02

\* cited by examiner

SCALING MOBILE GATEWAYS IN A 3RD GENERATION PARTNERSHIP PROJECT (3GPP) NETWORK

TECHNICAL FIELD

This disclosure relates in general to the field of computing and/or networking, and more particularly, to scaling mobile gateways in a 3rd Generation Partnership Project (3GPP) network.

BACKGROUND

The 3rd Generation Partnership Project (3GPP) is a collaboration between groups of telecommunications associations. The 3GPP standard encompasses radio access networks (RAN), telecommunications associations services and systems aspects, and core network and terminals. The 3GPP standard caters to a large majority of telecommunications networks and is the standard body behind Universal Mobile Telecommunications System (UMTS)/3G, Long-Term Evolution (LTE)/4G, and New Radio (NR)/5G.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION

Example Embodiments

The following detailed description sets forth example embodiments of apparatuses, methods, and systems relating to scaling mobile gateways in a 3GPP network. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials and configurations are set forth in order to provide a thorough understanding of the illustrative implementations. However, it will be apparent to one skilled in the art that the embodiments disclosed herein may be practiced without the specific details. In other instances, well-known features are omitted or to not obscure the illustrative implementations.

In the following detailed description, reference is made to the accompanying drawings that form a part hereof where like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1A:
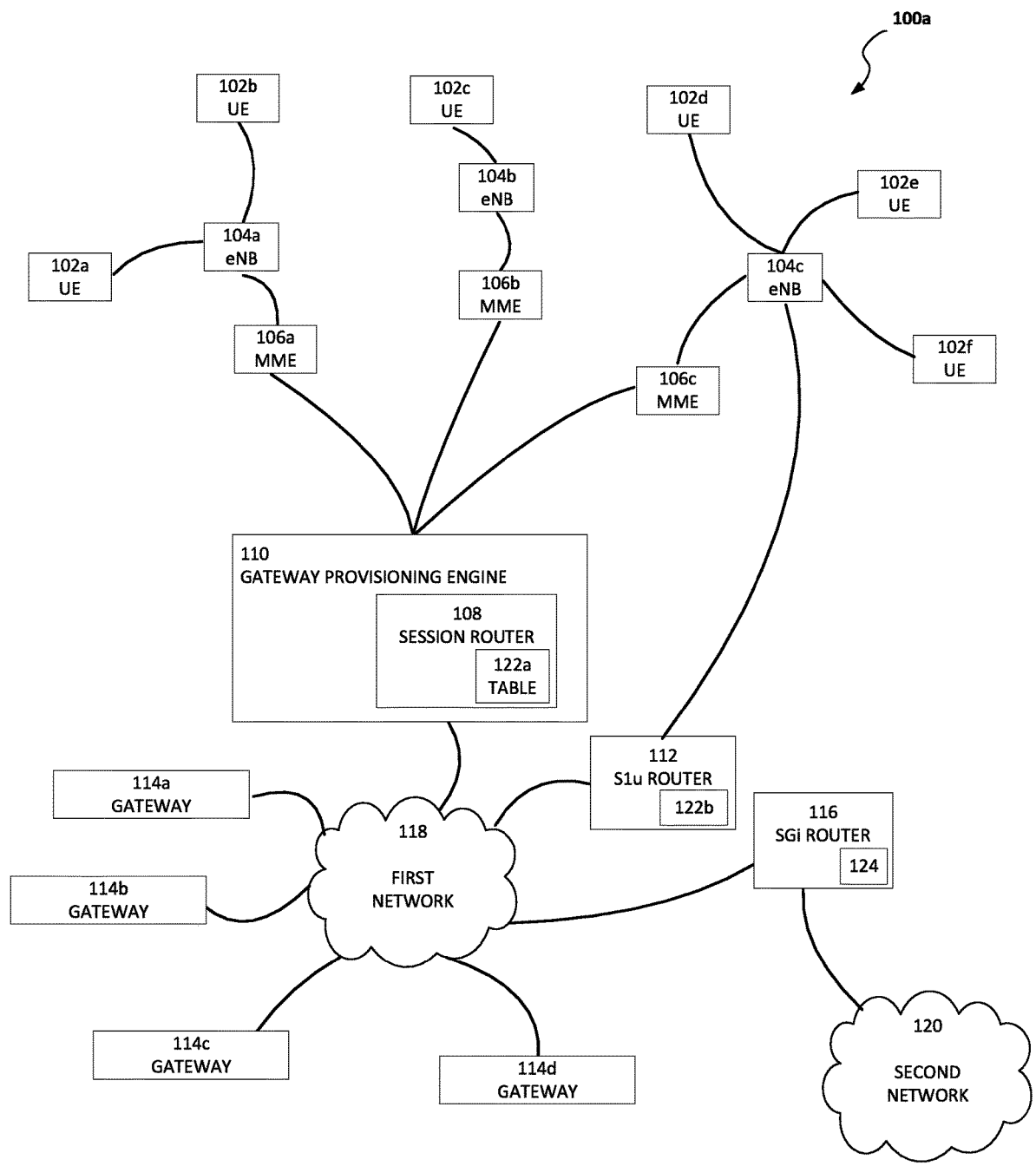
FIG. 1A is a simplified block diagram of a system to enable scaling mobile gateways in a 3GPP network, in accordance with an embodiment of the present disclosure.

FIG. 1A is a block diagram of a system 100a to enable scaling mobile gateways in a 3GPP network, in accordance with an embodiment of the present disclosure. System 100a can include one or more user equipment (UE) 102a-102f, one or more E-UTRAN Node Bs (eNodeB) 104a-104c, one or more mobility management entities (MMEs) 106a-106c, a session router 108, a gateway provisioning engine 110, an S1u router 112, a plurality of gateways 114a-114d, and an SGi router 116. In an example, gateway provisioning engine 110 can include session router 108. Session router 108 can include a tunnel endpoint identifier (TEID) table 122a. In addition, S1u router 112 can include TEID table 122b. In an example, table 122a can include S11 related TEIDs and TEID table 122b can include S1u related TEIDs. SGi router 116 can include an Internet protocol (IP) table 124. Gateway provisioning engine 110, S1u router 112, plurality of gateways 114a-114d, and SGi router 116 can be in communication with each other using a first network 118. In an example, first network 118 is part of a data center. SGi router 116 can also be in communication with second network 120. Second network 120 can be an open network such as the Internet or some other network that is different than first network 118.

In an example, session router 108 may be an S11 router and configured as an interface between an MME (e.g., MME 106a) and a gateway (e.g., gateway 114a) in an LTE network. Session router 108 can be configured to forward packets to a specific gateway based on the TEID and/or IP address associated with the packet. S1u router 112 can provide non guaranteed data delivery of LTE user plane protocol data units (PDUs) between an eNodeB (e.g., eNodeB 104a) and a gateway (e.g., gateway 114a) and is responsible for delivering user data between the eNodeB and a gateway (e.g., a servicing gateway (S-GW)).

Figure 1B:
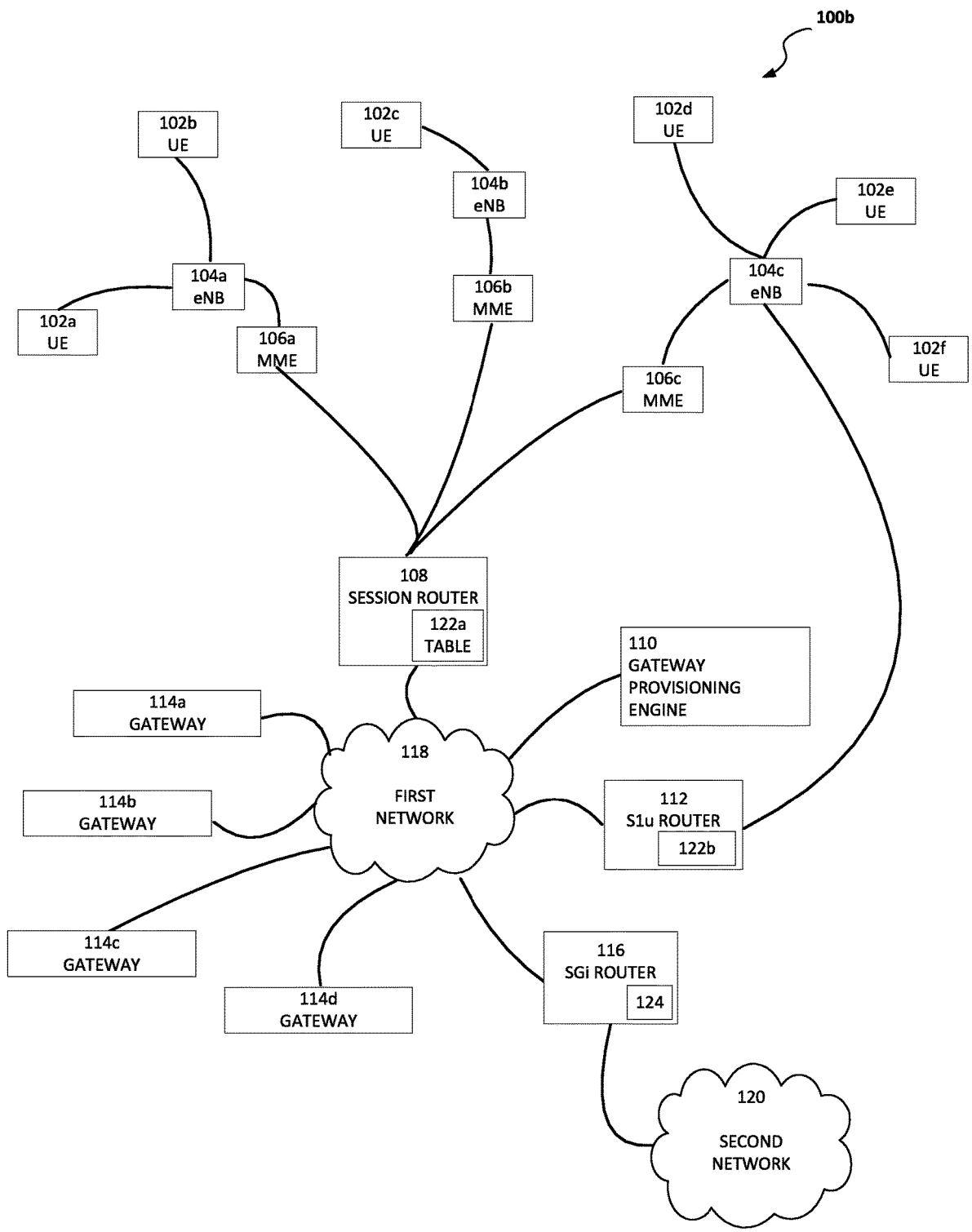
FIG. 1B is a simplified block diagram of a system to enable scaling mobile gateways in a 3GPP network, in accordance with an embodiment of the present disclosure.

Turning to FIG. 1B, FIG. 1B is a block diagram of a system 100b, in accordance with an embodiment of the present disclosure. As illustrated in FIG. 1B, session router 108 is separate from gateway provisioning engine 110 and MMEs 102a-102c can be in communication with session router 108. Session router 108, gateway provisioning engine 110, S1u router 112, gateways 114a-114d, and SGi router 116 may be in communication using first network 118.

Figure 1C:
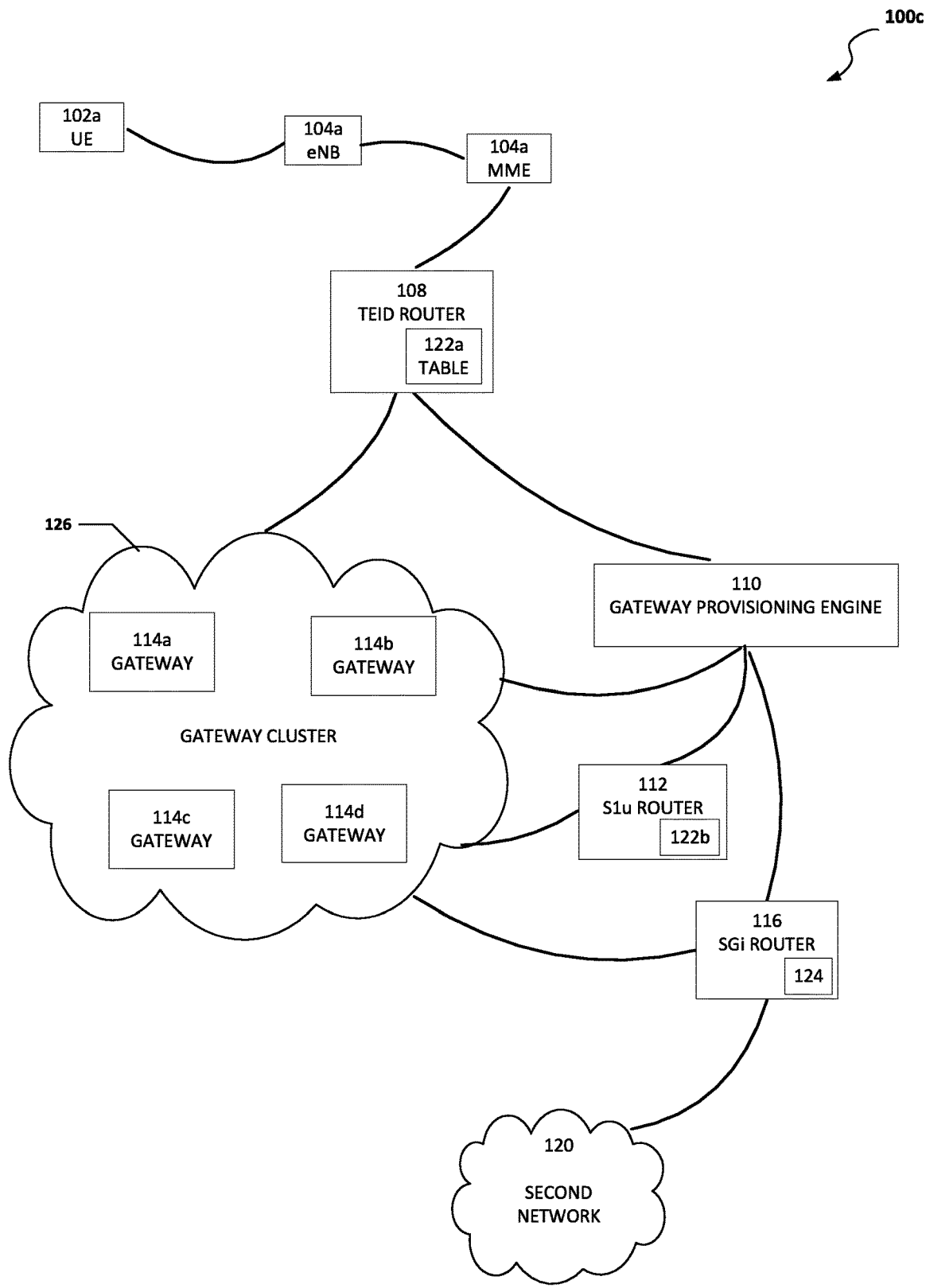
FIG. 1C is a simplified block diagram of a system to enable scaling mobile gateways in a 3GPP network, in accordance with an embodiment of the present disclosure.

Turning to FIG. 1C, FIG. 1C is a block diagram of a system 100c, in accordance with an embodiment of the present disclosure. As illustrated in FIG. 1C, plurality of gateways 114a-114d may be part of a gateway cluster 126. In addition, session router 108 may be a TEID router. Gateway cluster 126 includes a scalable number of heterogeneous gateways, with each instance performing gateway functions as defined by the 3GPP specification on a subset of established sessions. Each gateway instance can be configured and optimized to handle only one type of traffic (e.g., IoT traffic, voice traffic, video traffic, etc.).

Session router 108, gateway provisioning engine 110, S1u router 112, gateways 114a-114d, and SGi router 116 can be part of a data center. Each of the plurality of gateways 114a-114d may be an S-GW, a packet data network gateway (P-GW), a combination S-GW and P-GW, a serving general packet radio service support node (SGSN), user plane function (UPF) node, user plane function (SME) node, etc. If a specific gateway (e.g., gateway 114a) is an S-GW or includes S-GW functionality, the specific gateway can forward user data packets, while also acting as a mobility anchor for the user plane during handovers (e.g., inter-eNodeB handovers) and can be an anchor for mobility between LTE and other 3GPP technologies. If a specific gateway (e.g., gateway 114b) is a P-GW or includes P-GW functionality, the specific gateway can provide connectivity from a UE (e.g., UE 102a) to external packet data networks by being a point of exit and entry of traffic associated with the UE. The UE may have simultaneous connectivity with more than one P-GW for accessing multiple packet data networks (PDNs). In addition, the specific gateway can be configured to perform policy enforcement, packet filtering, charging support, lawful interception, packet screening, etc. Further, the specific gateway can be configured to act as the anchor for mobility between 3GPP and non-3GPP technologies such as WiMAX, 3GPP2, Code Division Multiple Access (CDMA), 1 Times (or Single-Carrier) Radio Transmission Technology (1×RTT or ×1), Evolution-Data Optimized (EvDO), etc.

System 100a, 100b, and/or 100c may be part of a 3GPP network. Each of UE 102a-102f can include mobile devices, personal digital assistants, smartphones, tablets, wearable technology, laptop computers, Internet of Things (IoT) devices, desktop computers, or other similar devices. Each of MME 106a-106b can be part of a base transceiver station, cell site, base station, etc. that is configured to facilitate communications (e.g., wireless communication) between each UE and session router 108. When an UE begins a new session, gateway provisioning engine 110 can be configured to choose a gateway instance to handle the session based on usage/congestion information, service requirement, round-robin, etc. Egress packets originating from the gateway instances are forwarded to a UE without exception to the UE.

It is to be understood that other embodiments may be utilized and structural changes may be made without departing from the scope of the present disclosure. Substantial flexibility is provided by systems 100a-100c in that any suitable arrangements and configuration may be provided without departing from the teachings of the present disclosure. For example, although systems 100a-100c are described for use with mobile core traffic, systems 100a-100c could also be used for general orchestration, such as task scheduling, or traffic routing of other types of traffic (e.g., data center traffic) where flows are established and distributed across heterogeneous endpoints. Systems 100a-100c can be generalized to many data center and/or other use cases.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur. Reference to "one embodiment" or "an embodiment" in the present disclosure means that a particular feature, structure, or characteristic described in connection with the embodiment is included in at least one embodiment. The appearances of the phrase "in one embodiment" or "in an embodiment" are not necessarily all referring to the same embodiment.

For purposes of illustrating certain example techniques of systems 100a-100c, it is important to understand the communications that may be traversing the network environment. The following foundational information may be viewed as a basis from which the present disclosure may be properly explained.

3GPP is a collaboration between groups of telecommunications associations. The initial scope of 3GPP was to establish a globally applicable third-generation (3G) mobile phone system specification based on an evolved global system for mobile communications (GSM). The scope was later broadened to include the development and maintenance of GSM and related 2G and 2.5G standards, including General Packet Radio Service (GPRS), GSM Evolution (EDGE), and Universal Mobile Telecommunications Service (UMTS). The scope of 3GPP was further broadened to include related 3G standards, including High Speed Packet Access (HSPA), LTE related 4G standards (including LTE Advanced and LTE Advanced Pro), next generation and related 5G standards, and an evolved IP Multimedia Subsystem (IMS) developed in an access independent manner. The 3GPP standard encompasses RAN, services and systems aspects, and core network and terminals. The 3GPP standard caters to a large majority of telecommunications networks and is the standard body behind UMTS, which is the 3G upgrade of GSM.

As network elements migrate from hardware solutions to utilizing the flexibility and performance capabilities of software solutions, the mobile core network nodes are sometimes unable to efficiently cope. Current solutions are inflexible in that resources are bound with limited capacity for specific functions. Some gateway solutions could potentially enable massive scaling but current solutions are limited and often add significant additional parsing or (often proprietary) protocol redundancy and do not fully optimize separating signaling traffic flows. For example, several previous solutions have attempted to use SDN controllers in a way that is inconsistent with their intended use and have traffic running through the slow path of the controller. Additionally, existing solutions often require complicated external load-balancing mechanisms and also present many barriers to scalability including limited transactions per second due to various bottlenecks. Even when adding additional instances and hardware, existing solutions still face issues with session migration in the case of downtime or upgrades. What is needed is a system to allow for scalability of mobile gateways in a 3GPP network.

A system to enable scaling mobile gateways in a 3GPP network, as outlined in FIGS. 1A-1C and herein, can resolve these issues (and others). Systems 100a-100c can be configured to scale mobile gateways in 3GPP core networks by efficiently leveraging the power of software defined networks (SDN) and network functions virtualization (NFV). More specifically, systems 100a-100c can be configured to address the need for scalability by enabling additional gateway instances to be dynamically created or destroyed based on load for a specific traffic class. Scalability can be enabled by simplifying the routes that packets flow through the system. To do this, systems 100a-100c can be configured such that both signaling and user data traffic can be forwarded to the correct gateway instance by an identifier such as a TEID or IP routing.

In addition, systems 100a-100c can include a scalable number of heterogeneous gateway instances (e.g., gateways 108a-108d), with each instance performing gateway functions on a subset of established sessions. In a specific example, each gateway instance can be configured to handle only one type of traffic (such as IoT traffic or voice traffic). Additional gateway instances can be dynamically added or removed based on load for a specific traffic class.

In an example, neighboring entities view session router 108, gateway provisioning engine 110, and plurality of gateways 114a-114d, as a single instance. Therefore, from the perspective of gateway peers (e.g. MME, eNB, IMS, external packet data networks (e.g., second network 120), etc.), systems 100a-100c are seen to act no differently than current gateways. This has the consequence that any IPSec encryption required along established S1u, SGi, and S11 interfaces would land upon the respective routers (e.g., S1u router 112, SGi router 116, etc.), which would be responsible for managing the encryption. If security within systems 100a-100c is required, for instance in distributed or leased data center deployments, Peer-to-Peer encryption can be utilized between session router 108 and plurality of gateways 114a-114d.

In an example, systems 100a-100c can be configured to allow for independent scaling of functions, specifically a clean separation of user plane packet processing and signal processing which uses only standardized protocols. This can be done through the combination of a minimal-state TEID-based session router (e.g., session router 108), a distributed SDN-based orchestrator (e.g., gateway provisioning engine 110 or SDN controller 132 illustrated in FIG. 2) to handle session load balancing and control dynamic gateway (e.g., gateways 114a-114d) scaling, and heterogeneous cellular core processing gateway instances to process different classes of traffic. This can provide relatively faster traffic processing as compared with current systems and can help facilitate dynamic scalability of cellular gateway instances. In an example, systems 100a-100c can use an orchestrator with control user plane separation (CUPS).

As defined by 3GPP specifications, mobile network cores use the GTPv2 (GPRS Tunneling for control plane) protocol for signaling along the S11 and S5/S8 interfaces. These interfaces are exposed by the gateways (e.g., both S-GWs and P-GWs). GTPv2 messages include TEIDs to provide context for these signaling events and to allow mapping of signaling events to user connections. In normal operation of existing systems, signaling traffic is routed per IP to its destination. Systems 100a-100c can be configured utilize a TEID router to efficiently partition signaling traffic.

Session router 108 can be configured as a TEID cluster router for the signaling interfaces that operate on ranges of TEIDS. In an example, session router 108 does not store individual flows and includes a table (e.g., TEID table 122) of TEID ranges associated with gateway instances (e.g., one or more of gateways 108a-108d). For existing sessions, the TEID is non-zero and ingress GTPv2c messages are forwarded per their TEID. The TEID router forwards the message along the logical signaling interface to the correct gateway instance based on the TEID. In this case, session router 108 can perform simple forwarding and no extra processing is conducted on the message in excess to 3GPP specification. For new sessions the TEID is zero (slow path/exception) and session router 108 can communicate the packet to gateway provisioning engine 110, which will choose a gateway instance to handle the message (either based on usage/congestion information, service, or round-robin). Egress packets originating from gateway instances are forwarded by the router without exception to an endpoint.

Each of gateways 114a-114d can be a heterogeneous cellular core processing gateway instances configured to process a specific class of traffic. Although gateways 114a-114d are describe as cellular core gateways, systems 100a-100c can be adapted for other types of running services (such as data center backend services), with, depending on protocol, routing based on a different field other than TEID. A key difference between gateways 114a-114d instances and those defined in 3GPP specifications is TEID and IP provisioning. As each of gateways 114a-114d are initiated, a disjoint subset of TEID and IPs are provisioned by gateway provisioning engine 110 to each of gateways 114a-114d for use. This differs from existing design as gateways may use any 32 bit TEID value or IP associated by the provisioned access point name (APN). Scaling is accomplished natively, by routing traffic per TEID value or standard IP based rules.

Systems 100a-100c can be configured to allow for independent scaling of signaling and user data packet processing. Some proposed mobile core software-based gateways that use an SDN controller place the SDN controller such that it is always in the fast (common) path of signaling traffic and require the SDN controller to parse signaling traffic. This means that every packet from an MME must flow through the SDN, even for established sessions. This practice strays far from the traditional use of SDN controllers where the SDN controller simply pushes rules out to switches and only sees packets when the switches do not have rules for a specific packet. One current solution uses TEID-routing and an additional external load balancer which adds additional overhead for service provisioning. Additionally, this architecture dictates the MME should be collapsed with the P-GW and S-GW as a network slice. Other existing mobile core software/SDN-based solutions position the SDN controller between the MME and the S-GW and do not make use of TEID routing.

Some emerging trends have the potential to impact the mobile core and include the virtualization of packet processing on commodity servers. As a result, individual servers implementing gateways will have far less capacity than purpose built hardware and the number of entities across which load balancing will be required will increase. In addition, as the number load of mobile gateways in terms of signaling and data traffic increase, additional gateways will be required. Systems 100a-100c can be configured to reduce the load balancing required by the MME as the S-GW pool size is effectively reduced and systems 100a-100c can be configured to implement a one-time provisioning and routing scheme.

Also, systems 100a-100c may be utilized in conjunction with S1-flex. An important feature of the S1 interface linking the access network to the content network is known as "S1-flex." In an S1-flex configuration, each eNB is connected to all evolved packet core (EPC) nodes within a pool area. This is a concept whereby multiple content network nodes (e.g., MME/S-GWs) can serve a common geographical area, being connected by a mesh network to a set of eNodeBs in that area. An eNodeB may thus be served by multiple MME/S-GWs. The set of MME/S-GW nodes that serve a common area is called an MME/S-GW pool and the area covered by such a pool of MME/S-GWs is called a pool area. This concept allows UEs in the cell or cells controlled by one eNodeB to be shared between multiple content network nodes, thereby providing a possibility for load sharing and also eliminating single points of failure for the content network nodes. The UE context normally remains with the same MME as long as the UE is located within the pool area.

Elements of FIGS. 1A-1C may be coupled to one another through one or more interfaces employing any suitable connections (wired or wireless), which provide viable pathways for network (e.g., first network 118, etc.) communications. Additionally, any one or more of these elements of FIGS. 1A-1C may be combined or removed from the architecture based on particular configuration needs. Systems 100a-100c may include a configuration capable of transmission control protocol/Internet protocol (TCP/IP) communications for the transmission or reception of packets in a network. Systems 100a-100c may also operate in conjunction with a user datagram protocol/IP (UDP/IP) or any other suitable protocol where appropriate and based on particular needs.

Turning to the infrastructure of FIGS. 1A-1C, systems 100a-100c in accordance with an example embodiment are shown. Generally, systems 100a-100c may be implemented in any type or topology of networks. First network 118 represents a series of points or nodes of interconnected communication paths for receiving and transmitting packets of information that propagate through system 100. First network 118 offers a communicative interface between nodes and may be configured as any local area network (LAN), VLAN, wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In systems 100a-100c, network traffic, which is inclusive of packets, frames, signals, data, etc., can be sent and received according to any suitable communication messaging protocols. Suitable communication messaging protocols can include a multi-layered scheme such as the Open Systems Interconnection (OSI) model, or any derivations or variants thereof (e.g., TCP/IP and UDP/IP, by way of nonlimiting example). Additionally, radio signal communications over a cellular network may also be provided in systems 100a-100c. Suitable interfaces and infrastructure may be provided to enable communication with the cellular network.

The term "packet," as used herein, refers to a unit of data that can be routed between a source node and a destination node on a packet switched network. A packet includes a source network address and a destination network address. These network addresses can be IP addresses in a TCP/IP messaging protocol. The term "data," as used herein, refers to any type of binary, numeric, voice, video, textual, or script data, or any type of source or object code, or any other suitable information in any appropriate format that may be communicated from one point to another in electronic devices and/or networks.

In an example implementation, eNBs 104a-104c, MMEs 106a-106c, session router 108, gateway provisioning engine 110, S1u router 112, plurality of gateways 114a-114d, and SGi router 116 are meant to encompass network appliances, servers, routers, switches, gateways, bridges, load balancers, processors, modules, or any other suitable device, component, element, or object operable to exchange information in a network environment. eNBs 104a-104c, MMEs 106a-106c, session router 108, gateway provisioning engine 110, S1u router 112, plurality of gateways 114a-114d, and SGi router 116 may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information. Each of eNBs 104a-104c, MMEs 106a-106c, session router 108, gateway provisioning engine 110, S1u router 112, plurality of gateways 114a-114d, and SGi router 116 may be virtual or include virtual elements.

In regard to the internal structure associated with system 100, each of eNBs 104a-104c, MMEs 106a-106c, session router 108, gateway provisioning engine 110, S1u router 112, plurality of gateways 114a-114d, and SGi router 116 can include memory elements for storing information to be used in the operations outlined herein. Each of eNBs 104a-104c, MMEs 106a-106c, session router 108, gateway provisioning engine 110, S1u router 112, plurality of gateways 114a-114d, and SGi router 116 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in systems 100a-100c could be provided in any database, register, queue, table, cache, control list, or other storage structure, all of which can be referenced within any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, elements of systems 100a-100c, such as eNBs 104a-104c, MMEs 106a-106c, session router 108, gateway provisioning engine 110, S1u router 112, plurality of gateways 114a-114d, and SGi router 116 may include software modules (e.g., gateway provisioning engine 110, session router 108 orchestration manager 130, SDN controller 132, load balancer 134, etc.) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations as outlined herein.

Additionally, each of eNBs 104a-104c, MMEs 106a-106c, session router 108, gateway provisioning engine 110, S1u router 112, plurality of gateways 114a-114d, and SGi router 116 may include a processor (or core of a processor) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read-only memory (EPROM), an electrically erasable programmable read-only memory (EEPROM) or an ASIC that includes digital logic, software, code, or electronic instructions), or any suitable combination thereof. Any of the potential processing elements, modules, and machines described herein should be construed as being encompassed within the broad term 'processor.'

Figures 2, 3, 4:
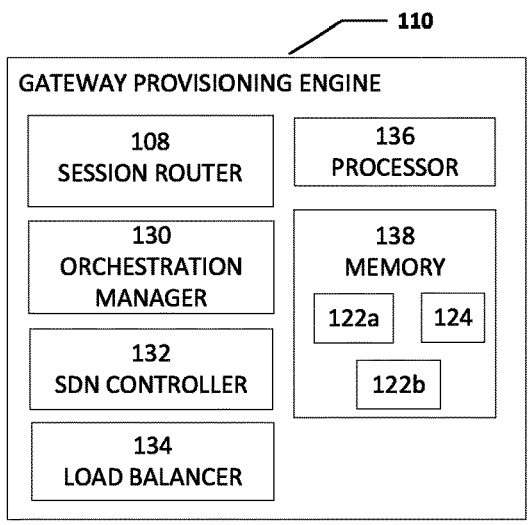
FIG. 2 is a simplified block diagram of a portion of a system to enable scaling mobile gateways in a 3GPP network, in accordance with an embodiment of the present disclosure.
FIG. 3 is a simplified block diagram of a table illustrating example details of a system to enable scaling mobile gateways in a 3GPP network, in accordance with an embodiment of the present disclosure.
FIG. 4 is a simplified block diagram of a table illustrating example details of a system to enable scaling mobile gateways in a 3GPP network, in accordance with an embodiment of the present disclosure.

Turning to FIG. 2, FIG. 2 is a block diagram of a portion of a system 100 (i.e., system 100a, 100b, and/or 100c), in accordance with an embodiment of the present disclosure. As illustrated in FIG. 2, gateway provisioning engine 110 can include session router 108, an orchestration manager 130, an SDN controller 132, a load balancer 134, a processor 136, and memory 138. Memory 138 can include TEID tables 122a and 122b and IP table 124.

When a UE (e.g., UE 102a) first connects to system 100, a new session packet for the new session can be communicated to session router 108. Per the 3GPP protocol, the TEID for the new session packet is zero (slow path/exception). The endpoint determines the TEID to be used by the sending node for a particular context. In the case of the S11 interface, before a session is established, a gateway has yet to assign a TEID to the session, thus when the MME sends a create session request for the new session to the gateway, it uses a TEID equal to zero ("TEID=0") indicating that this message refers to no established session context. The use of TEID=0 for sessions not yet created is part of the 3GPP Technical Specification 29.274 on GTPv2c.

When session router 108 receives the new session packet, the packet can be forwarded to SDN controller 132. SDN controller 132 can have knowledge of all incoming (TEID=0) traffic. SDN controller 132 can be configured to create session request messages and use load balancer 134 to provide a centralized vantage point of information about network load, load profile, and gateway congestion (based on feedback forwarded from the gateways), allowing SDN controller 132 to dynamically manage sessions and scale gateways as analytics dictate. For example, load balancer 134 can be used to determine load balancing, handle additional functionality such as pushing TEID and IP routing rules, store persistent states (such as stats), and manage (creating and destroying) gateway instances based on traffic feedback from the gateways. Because gateway provisioning engine 110 is in a centralized location (although gateway provisioning engine 110 may be at least partially distributed as illustrate in FIG. 5), gateway provisioning engine 110 can make relatively quick decisions regarding the scaling of gateway instances, and adapt dynamically to traffic profiles. In addition, SDN controller 132 can be configured to manage session router 108 for signaling traffic and install flow rules on routers (e.g. S1u router 112, SGi router 116, etc.) serving user data packets on a gateway cluster, a more traditional use of a SDN that is often not present in existing solutions.

In an example, gateway provisioning engine 110 can be configured to control and scale a group of gateway instances. For example, gateway instances can be added or removed from the system based on system traffic. On startup of a gateway instances (e.g. the system has determined that it needs to scale and add a gateway), orchestration manager 130 can be configured to push routing rules to routers (e.g., S1u router 112, SGi router 116, etc.) as specified by an administrator (e.g., using an Open Flow protocol or some other similar protocol that gives access to the forwarding plane of a network switch or router). The routing rules can include a range of TEIDs and IPs that are to be handled by a specific gateway. In an example, TEID based rules can be defined with vendor extensions. Gateway provisioning engine 110 can also manage a cluster of gateway instances (with the help of Docker Swarm, Kubernetes, or some other similar technology) by requesting/receiving load statistics (e.g., basic descriptive information, performance counters statistics, log file entries, etc.). Gateway provisioning engine 110 can be configured to spawn new gateway instances (with varying capabilities), initiate migration events between gateway instances, and disable gateway instances dynamically.

Load balancer 134 can be configured to handle exceptions from the session router. For example, these exceptions can include GTPv2 messages with a TEID value of zero (which can indicate a create session request). In addition, load balancer 134 can select a gateway instance based on static rules installed either statically from file/DB or dynamically by an operator interface or in response traffic feedback. SDN controller 132 can also handle GTPv2 ECHO Request/Response for keep-alive messages.

Turning to FIG. 3, FIG. 3 is a block diagram of TEID table 122 for use in system 100, in accordance with an embodiment of the present disclosure. As illustrated in FIG. 3, TEID table 122 can include a TEID column 140 and a gateway column 142. TEID column 140 can include a range of TEID identifiers (e.g., 100-200, 500-600, etc.). Gateway column 142 can include an identifier that identifies a gateway associated with a corresponding TEID in TEID column 140.

When a new session starts, gateway provisioning engine 110 can be configured to use load balancer 134 and SDN controller 132 to determine a specific gateway instance to be associated with the new session. Once a specific gateway instance is determined, the specific gateway will assign a TEID for the session from the range of TEIDS associated with the specific gateway. Gateway provisioning engine 110 can communicate TEID table 122 to session router 108. When a packet arrives at session router 108, session router 108 can determine the TEID associated with the packet and use TEID table 122 to communicate the packet to the proper gateway instance.

Turning to FIG. 4, FIG. 4 is a block diagram of IP table 124 for use in system 100, in accordance with an embodiment of the present disclosure. As illustrated in FIG. 4, IP table 124 can include an IP column 144 and a gateway column 146. IP column 144 can include a range of IPs identifiers (e.g., 16.0.0.0-16.0.0.254, etc.). IP Ranges are provisioned to each gateway to be used by or associated with UEs, and each UE (generally) will only have a single IP within the IP range assigned to a gateway. Gateway column 146 can include an identifier that identifies a gateway associated with a corresponding IP identifier in IP column 144. As traffic arrives at SGi router 116, for each packet, SGi router 116 can determine the destination (UE) IP within the packet, and search for that IP in IP table 124 containing ranges of UE IPs (144). The result of the lookup will be the gateway originally provisioned to process traffic for the matching UE IP range.

Figure 5:
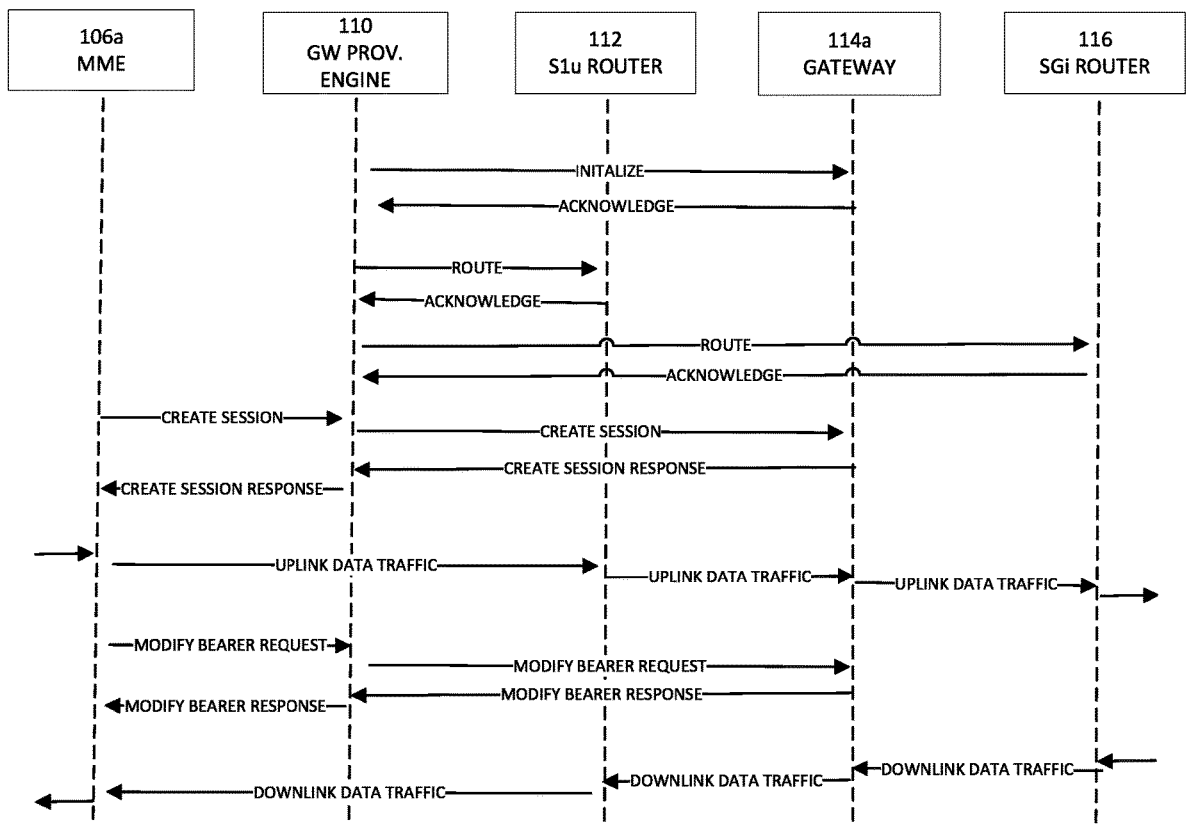
FIG. 5 is a simplified timing diagram of example details to enable scaling mobile gateways in a 3GPP network, in accordance with an embodiment of the present disclosure.

Turning to FIG. 5, FIG. 5 is a timing diagram illustrating example details of scaling mobile gateways in a 3GPP network, in accordance with an embodiment. In an example, gateway 108a can be initialized by gateway provisioning engine 110 and gateway 108a can send an acknowledgment response back to gateway provisioning engine 110. During the initialization, gateway provisioning engine 110 can provision gateway 108a with unique values or ranges for use by gateway 108a. More specifically, gateway provisioning engine 110 can provision gateway 108a with unique TEID ranges, UE IP subnet ranges, and/or other unique values or ranges for use by gateway 108a. After gateway 108a is initialized, gateway provisioning engine 110 can communicate routing rules and format receiving and transmitting interfaces for S1u router 112 and SGi router 116. More specifically, gateway provisioning engine 110 can communicate the unique UE IP subnet ranges, TEID ranges, and/or other unique values or ranges that were provisioned for use by gateway 108a.

When a new session starts where no context has been established, the TEID for the create session packet will be zero and MME 106a will communicate a new session request to gateway provisioning engine 110. Using load balancer 134 and SDN controller 132 (not shown), gateway provisioning engine 110 can be configured to determine that gateway 108a should be to be associated with the created session. Gateway provisioning engine 110 can communicate a create session request to gateway 108a. Gateway 108a can allocate an IP within the IP subnet range it was assigned during initialization, allocate a TEID from the TEID ranges it was assigned during initialization, and communicate an acknowledgement message along with the allocated TEID and IP to the UE that initiated the session request.

Using the allocated TEID and IP in packets related to the session, an eNodeB can communicate packets directly to the gateway assigned to handle the session and bypass MME 106a, session router 108, and gateway provisioning engine 110. If a modified bearer request is initiated (e.g., UE is moving from one location to another location, a downlink tunnel to an eNodeB has changed, etc.), a modified bearer request can be sent to gateway provisioning engine 110 and gateway provisioning engine 110 can communicate the modified bearer request to gateway 114a. The modified bearer request can be a request to communicate traffic or a packet destined for a specific UE to an eNodeB IP address and use a new tunnel ID.

Figure 6:
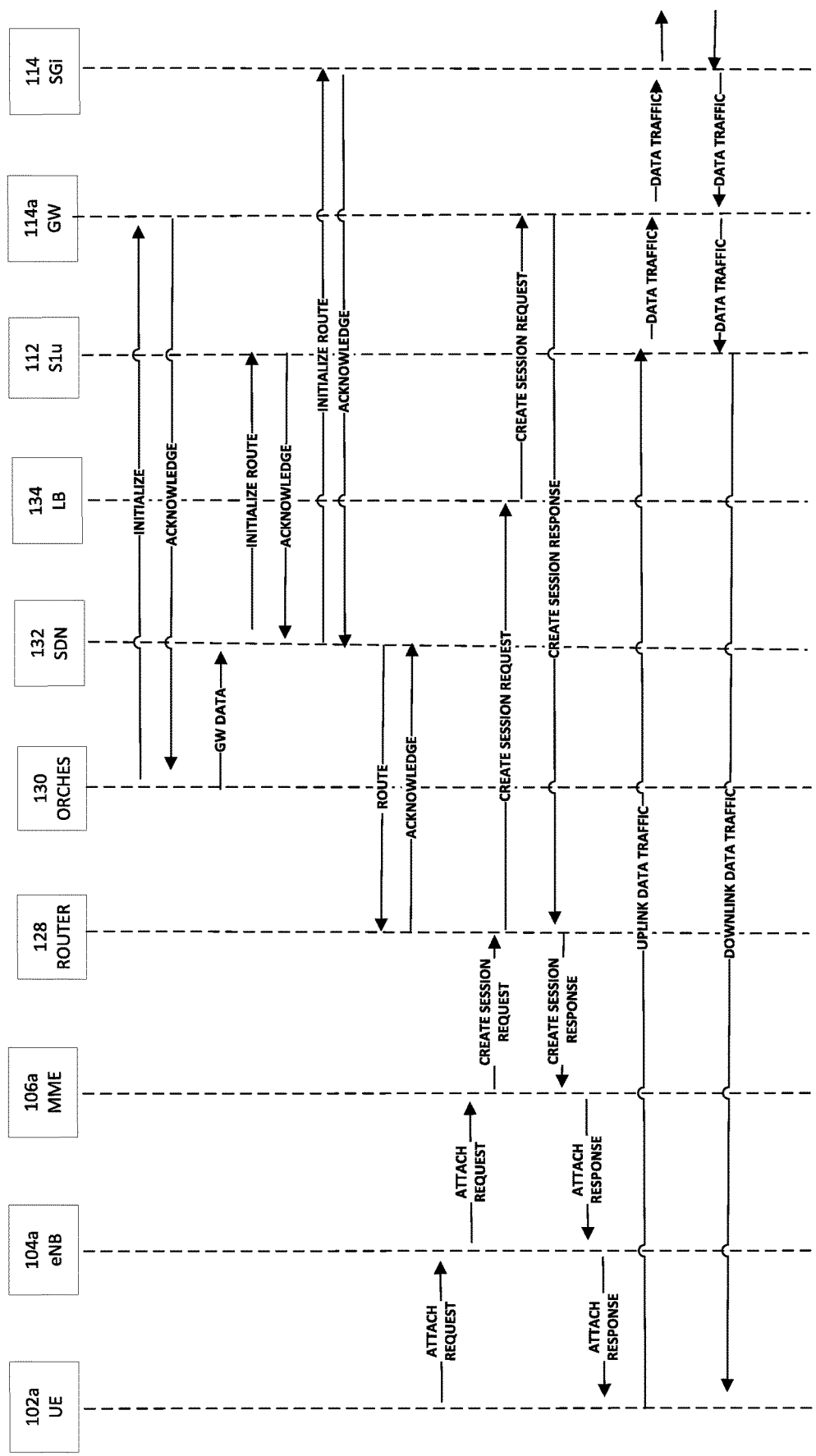
FIG. 6 is a simplified timing diagram of example details to enable scaling mobile gateways in a 3GPP network, in accordance with an embodiment of the present disclosure.

Turning to FIG. 6, FIG. 6 is a timing diagram illustrating example details of scaling mobile gateways in a 3GPP network, in accordance with an embodiment. In an example, gateway 114a can be initialized by orchestration manager 130 and gateway 114a can send an acknowledgment response back to orchestration engine 130. During the initialization, orchestration manager 130 can provision gateway 114a with unique values or ranges for use by gateway 114a. More specifically, orchestration manager 130 can provision gateway 114a with unique UE IP subnet ranges, TEID ranges, and/or other unique values or ranges for use by gateway 114a. After gateway 114a is initialized, orchestration manager 130 can communicate the unique values or ranges for use by gateway 114a (gateway data) to SDN controller 132. SDN controller 132 can use the gateway data to initialize routes and data paths on S1u router 112, SGi router 116, and session router 108.

When UE 102a connects to eNodeB 104a, an attachment request can be communicated from UE 102a to eNodeB 104a. eNodeB 104a can communicate the attachment request to MME 106a. MME 106a can send a create session request with a TEID of zero to session router 108. Because the TEID is zero, session router 108 will forward the session request to load balancer 134. Load balancer 134 analyzes the system, type of session, etc. and determines a specific gateway that should be allocated to handle the session. As illustrated in FIG. 6, gateway 114a was allocated or created to handle the session associated with UE 102a. Load balancer 134 sends the create session request to gateway 114a. Gateway 114a associates itself with the session, selects a unique value (e.g., a unique TEID value) from the range of values assigned by SDN controller 132 when gateway was initialized, and communicates a response to the create session request to session router 108. The response to the create session request includes the unique value (e.g., unique TEID value) gateway 114a selected to be associated with the session from UE 102a. Session router 108 communicates the response to the create session request (with the unique value) to MME 106a. MME 106a responds to the attachment request by eNodeB 104a and includes the unique value in the response to the attachment request. eNodeB 104a responds to the attachment request by UE 102a For uplink traffic, UE 102a can communicate directly with S1u router 112 using the unique value and S1u router 112 can use TEID table 122 (more specifically TEID table 122b illustrated in FIG. 1) to determine that gateway 114a is associated with the session and forward the traffic to gateway 114a. For downlink traffic, when traffic is received at SGi router 116, SGi router 116 can analyze the traffic, determine a unique identifier associated with the traffic (e.g., a destination IP address for UE 102a), use IP table 124 to determine that gateway 114a is associated with the session and forward the traffic to gateway 114a.

Figure 7:
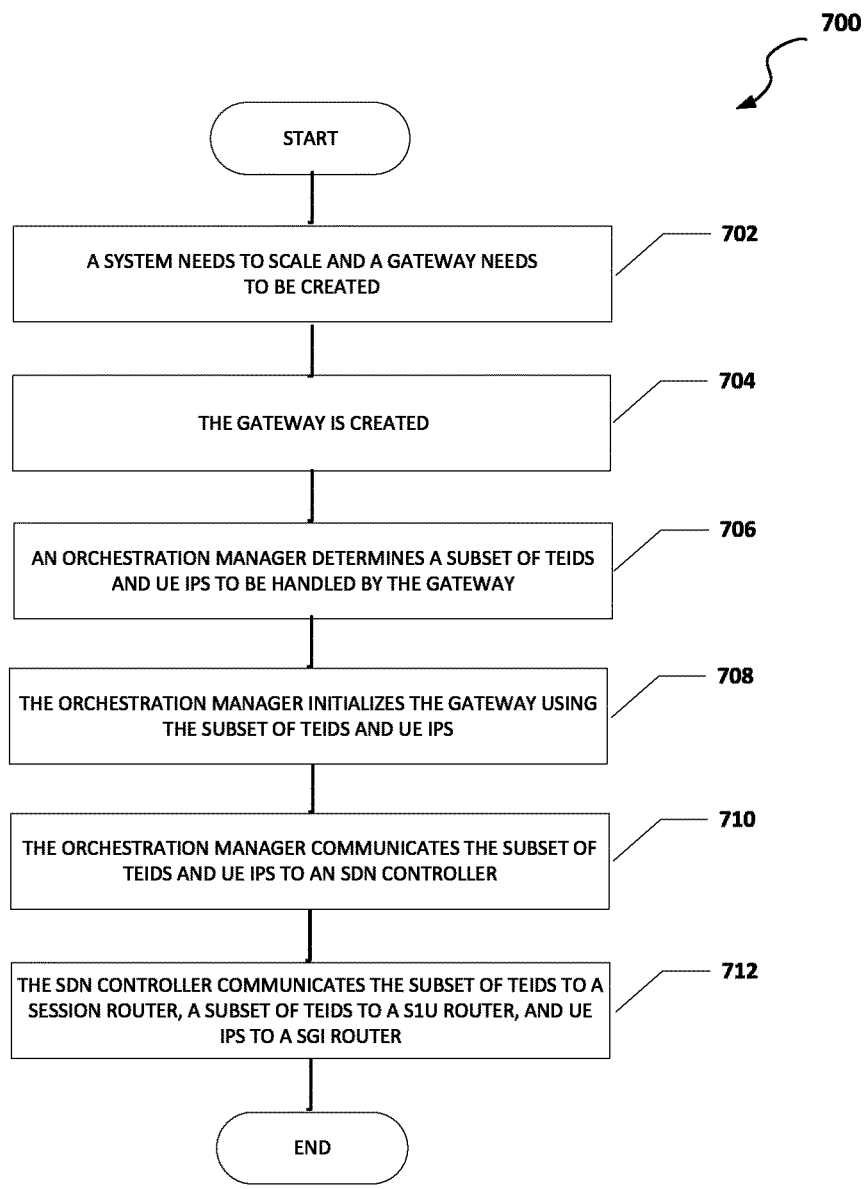
FIG. 7 is a simplified flowchart illustrating potential operations that may be associated with the system in accordance with an embodiment.

Turning to FIG. 7, FIG. 7 is an example flowchart illustrating possible operations of a flow 700 that may be associated with scaling mobile gateways in a 3GPP network, in accordance with an embodiment. In an embodiment, one or more operations of flow 700 may be performed by session router 108, gateway provisioning engine 110, orchestration manager 130, SDN controller 132, and/or load balancer 134. At 702, a system needs to scale and a new gateway needs to be created. For example, the system may determine that based on the current status of and traffic on the system, that the system needs to scale and a new gateway needs to be added. At 704, the gateway is created. At 706, an orchestration manager determines a subset of TEIDs and UE IPs to be handled by the gateway. At 708, the orchestration manager initializes the gateway using the subset of TEIDs and UE IPs. At 710, the orchestration manager communicates the subset of TEIDs and UE IPs to an SDN controller. At 712, the SDN controller communicates the subset of TEIDs to a session router, the subset of TEIDs to an S1u router, and the subset of UE IPs to an SGi router. For example, SDN controller 132 can communicate the subset of TEIDs to session router 108 as TEID table 122a, the subset of TEIDs to S1u router 112 as TEID table 122b, and the subset of UE IPs to SGI router 116 as IP table 124.

Figure 8:
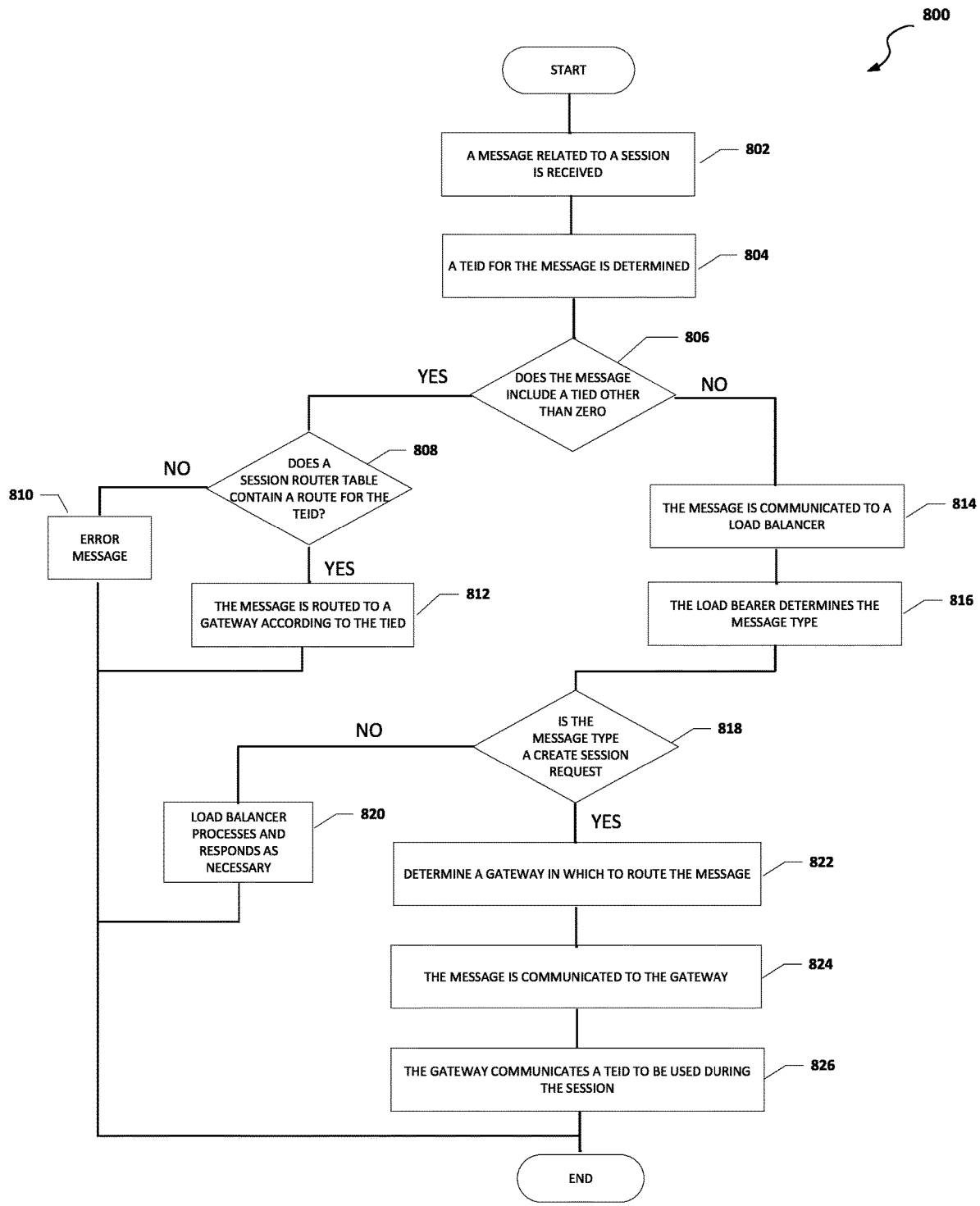
FIG. 8 is a simplified flowchart illustrating potential operations that may be associated with the system in accordance with an embodiment.

Turning to FIG. 8, FIG. 8 is an example flowchart illustrating possible operations of a flow 800 that may be associated with scaling mobile gateways in a 3GPP network, in accordance with an embodiment. In an embodiment, one or more operations of flow 800 may be performed by session router 108, gateway provisioning engine 110, orchestration manager 130, SDN controller 132, and/or load balancer 134. At 802, a message related to a session is received. For example, a message may be received at session router 108. At 804, a TEID for the message is determined. At 806, the system determines if the message includes a TEID other than zero. If the message includes a TEID other than zero, then the system determines if a session router table contains a route for the TEID, as in 808. For example, the message may be received at session router 108 and the system can determine if TEID table 122a includes a route that is associated with the determined TEID for the message. If the session router table does not contain a route for the TEID, then an error message is generated, as in 810. For example, the error message may be an error response message with cause, context not found. If the session router table does contain a route for the TEID, then the message is routed to a gateway according to the TEID, as in 812.

Going back to 806, if the message does not include a TEID other than zero (meaning the TEID is zero), then the message is communicated to a load balancer, as in 814. For example, the message may be received at session router 108, session router 108 can determine that the TEID is equal to zero, and session router 108 can communicates the message to load balancer 134. At 816, the load balancer determines the message type. At 818, the system determines if the message type is a create session request. If the message type is not a create session request, then the load balancer responds according to the message type, as in 820. For example, the message may be a request message for a status update from the load balancer. If the message type was a create session request, then the load balancer determines a gateway in which to route the message, as in 822. At 824, the message is communicated to the gateway. At 826, the gateway communicates a TEID to be used during the session.

Note that with the examples provided herein, interaction may be described in terms of two, three, or more network elements. However, these embodiments are for purposes of clarity and example only, and are not intended to be limiting. In certain cases, it may be easier to describe one or more of the functionalities of a given set of flows by only referencing a limited number of network elements. It should be appreciated that systems 100a-100c and their teachings are readily scalable and can accommodate a large number of components, as well as more complicated/sophisticated arrangements and configurations. Accordingly, the examples provided should not limit the scope or inhibit the broad teachings of systems 100a-100c as potentially applied to a myriad of other architectures.

It is also important to note that the operations in the preceding flow diagrams (i.e., FIGS. 7 and 8) illustrate only some of the possible correlating scenarios and patterns that may be executed by, or within, systems 100a-100c. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by systems 100a-100c in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although systems 100a-100c has been illustrated with reference to particular elements and operations that facilitate the communication process, these elements and operations may be replaced by any suitable architecture, protocols, and/or processes that achieve the intended functionality of systems 100a-100c.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example C1 is at least one machine readable storage medium having one or more instructions that when executed by at least one processor, cause the at least one processor to initialize a gateway, assign a range of tunnel endpoint identifiers (TEID) to the gateway, wherein the range of TEIDs are associated with the gateway, and communicate the range of TEIDs to routers, wherein each TEID in the range of TEIDs is used to by the router to route packets to the gateway.

In Example C2, the subject matter of Example C1 can optionally include where the one or more instructions that, when executed by at least one processor, cause the at least one processor to receive an initial message packet, wherein the initial message packet is part of a session and assign a specific TEID from the range of TEIDS to the session.

In Example C3, the subject matter of any one of Examples C1-C2 can optionally include where the gateway assigns the specific TEID for the session.

In Example C4, the subject matter of any one of Examples C1-C3 can optionally include where the initial message packet includes a TEID that is equal to zero.

In Example C5, the subject matter of any one of Examples C1-C4 can optionally include where the gateway is a servicing gateway (S-GW) or a packet data network gateway (P-GW).

In Example C6, the subject matter of any one of Examples C1-C5 can optionally include where the gateway is part of a gateway cluster that includes a scalable number of heterogeneous gateways.

In Example C7, the subject matter of any one of Examples C1-C6 can optionally include where a load balancer is used to determine that the gateway is initialized.

In Example C8, the subject matter of any one of Examples C1-C7 can optionally include where the gateway is part of a 3rd Generation Partnership Project (3GPP) network.

In Example A1, a server in a data center can include memory, a gateway provisioning engine, and at least one processor. The gateway provisioning engine is configured to cause the at least one processor to initialize a gateway, assign a range of tunnel endpoint identifiers (TEID) associated with the gateway, communicate the range of TEIDs to the gateway, and communicate the range of TEIDS to routers, wherein each TEID in the range of TEIDs will be used to route packets to the gateway and bypass mobility management entities.

In Example A2, the subject matter of Example A1 can optionally include where the gateway provisioning engine is further configured to cause the at least one processor to receive an initial message packet, wherein the initial message packet is part of a session and communicate the initial message packet to the gateway, wherein the gateway will assign a specific TEID from the range of TEIDS to the session.

In Example A3, the subject matter of any one of Examples A1-A2 can optionally include where the initial message packet includes a TEID that is equal to zero.

In Example A4, the subject matter of any one of Examples A1-A3 can optionally include where the gateway is a servicing gateway (S-GW) or a packet data network gateway (P-GW).

In Example A5, the subject matter of any one of Examples A1-A4 can optionally include where the gateway is part of a 3rd Generation Partnership Project (3GPP) network.

Example M1 is a method including receiving an initial message packet, wherein the initial message packet is part of a session, determining that a new gateway will be created for the session, assigning a tunnel endpoint identifier (TEID) for the session, wherein the TEID is associated with the gateway, and communicating the TEID to routers, wherein the TEID will be used to route packets related to the session to the gateway.

In Example M2, the subject matter of Example M1 can optionally include where the TEID is part of a range of TEIDS associated with the gateway when the gateway was initialized.

In Example M3, the subject matter of any one of the Examples M1-M2 can optionally include where the gateway assigns the TEID for the session.

In Example M4, the subject matter of any one of the Examples M1-M3 can optionally include where the initial message packet includes a TEID that is equal to zero.

In Example M5, the subject matter of any one of the Examples M1-M4 can optionally include where the gateway is part of a gateway cluster that includes a scalable number of heterogeneous gateways.

In Example M6, the subject matter of any one of Examples M1-M5 can optionally include where the gateway is part of a 3rd Generation Partnership Project (3GPP) network.

Example S1 is a system for calling mobile gateways in a 3rd Generation Partnership Project (3GPP) network. The system can include memory, one or more processors, means for receiving an initial message packet, wherein the initial message packet is part of a session, means for determining that a new gateway will be created for the session, means for assigning a tunnel endpoint identifier (TEID) for the session, wherein the TEID is associated with the gateway, and means for communicating the TEID to routers, wherein the TEID is used to route packets related to the session to the gateway.

In Example S2, the subject matter of Example S1 can optionally include where the TEID is part of a range of TEIDS associated with the gateway when the gateway was initialized.

In Example S3, the subject matter of any one of the Examples S1-S2 can optionally include where the gateway assigns the TEID for the session.

In Example S4, the subject matter of any one of the Examples S1-S3 can optionally include where a media access control layer remains unchanged when the direct radio interface path is established.

In Example S5, the subject matter of any one of the Examples S1-S4 can optionally include where the initial message packet includes a TEID that is equal to zero.

In Example S6, the subject matter of any one of the Examples S1-S5 can optionally include where the gateway is wherein the gateway is a servicing gateway (S-GW) or a packet data network gateway (P-GW).

In Example S7, the subject matter of any one of the Examples S1-S6 can optionally include where the gateway is part of a 3rd Generation Partnership Project (3GPP) network.

Example AA1 is an apparatus including means for initializing a gateway, means for assigning a range of tunnel endpoint identifiers (TEID) to the gateway, wherein the range of TEIDs are associated with the gateway, and means for communicating the range of TEIDs to routers, wherein each TEID in the range of TEIDs is used to by the router to route packets to the gateway and bypass mobility management entities.

In Example AA2, the subject matter of Example AA1 can optionally include means for receiving an initial message packet, wherein the initial message packet is part of a session and means for assigning a specific TEID from the range of TEIDS to the session.

In Example AA3, the subject matter of any one of Examples AA1-AA2 can optionally include where the gateway assigns the specific TEID for the session.

In Example AA4, the subject matter of any one of Examples AA1-AA3 can optionally include where the initial message packet includes a TEID that is equal to zero.

In Example AA5, the subject matter of any one of Examples AA1-AA4 can optionally include where the gateway is a servicing gateway (S-GW) or a packet data network gateway (P-GW).

In Example AA6, the subject matter of any one of Examples AA1-AA5 can optionally include where the gateway is part of a gateway cluster that includes a scalable number of heterogeneous gateways.

In Example AA7, the subject matter of any one of Examples AA1-AA6 can optionally include where a load balancer is used to determine that the gateway is initialized.

In Example AA8, the subject matter of any one of Examples AA1-AA9 can optionally include where the gateway is part of a 3rd Generation Partnership Project (3GPP) network.

Example X1 is a machine-readable storage medium including machine-readable instructions to implement a method or realize an apparatus as in any one of the Examples A1-A5, AA1-AA8, or M1-M6. Example Y1 is an apparatus comprising means for performing any of the Example methods M1-M6. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that, when executed by at least one processor, cause the at least one processor to:
    initialize a gateway;
    assign a range of tunnel endpoint identifiers (TEID) to the gateway, wherein the range of TEIDs are associated with the gateway;
    communicate the range of TEIDs to routers, wherein each TEID in the range of TEIDs is used to by the router to route packets to the gateway;
    receive an initial message packet from a user equipment, wherein the initial message packet is part of a session;
    communicate the initial message packet to a gateway provisioning engine, wherein the gateway provisioning engine assigns the session to the gateway, wherein the gateway assigns a specific TEID from the range of TEIDS to the session; and
    communicate the specific TEID to the user equipment, wherein using the specific TEID and an Internet Protocol identifier assigned to the session, an evolved-Node B (eNodeB) is configured to communicate packets from the user equipment, directly to the gateway assigned to the session and bypass mobility management entities and the gateway provisioning engine.

2. The at least one machine readable medium of claim 1, wherein the initial message packet includes a TEID that is equal to zero.

3. The at least one machine readable medium of claim 1, wherein the gateway is a servicing gateway (S-GW) or a packet data network gateway (P-GW).

4. The at least one machine readable medium of claim 1, wherein the gateway is part of a gateway cluster that includes a scalable number of heterogeneous gateways.

5. The at least one machine readable medium of claim 1, wherein a load balancer is used to determine that the gateway is initialized.

6. The at least one machine readable medium of claim 1, wherein the gateway is part of a 3rd Generation Partnership Project (3GPP) network.

7. The at least one machine readable medium of claim 1, wherein the gateway is part of a gateway cluster that includes a scalable number of heterogeneous gateways, wherein the heterogeneous gateways are configured to perform gateway functions as defined by a 3rd Generation Partnership Project (3GPP) specification on a subset of established sessions.

8. The at least one machine readable medium of claim 1, wherein the gateway is part of a gateway cluster that includes a scalable number of heterogeneous gateways, wherein each gateway in the gateway cluster is configured to handle only one type of traffic.

9. The at least one machine readable medium of claim 1, wherein when the gateway was initialized, a disjoint subset of TEID and Internet Protocol addresses were provisioned by the gateway provisioning engine to the gateway.

10. A server in a data center comprising:
    memory;
    a gateway provisioning engine; and
    at least one processor, wherein the gateway provisioning engine is configured to cause the at least one processor to:
    initialize a gateway;
    assign a range of tunnel endpoint identifiers (TEID) associated with the gateway;
    communicate the range of TEIDs to the gateway;
    communicate the range of TEIDS to routers, wherein each TEID in the range of TEIDs is configured to be used to route packets to the gateway and bypass mobility management entities;
    receive an initial message packet from a user equipment, wherein the initial message packet is part of a session; and
    assign the session to the gateway, wherein the gateway assigns a specific TEID from the range of TEIDS to the session and communicate the specific TEID to the user equipment, wherein using the specific TEID and an Internet Protocol identifier assigned to the session, an evolved-Node B (eNodeB) is configured to communicate packets from the user equipment, directly to the gateway assigned to the session and bypass mobility management entities and the gateway provisioning engine.

11. The server of claim 10, wherein the initial message packet includes a TEID that is equal to zero.

12. The server of claim 10, wherein the gateway is a servicing gateway (S-GW) or a packet data network gateway (P-GW).

13. The server of claim 10, wherein the gateway is part of a 3rd Generation Partnership Project (3GPP) network.

14. The server of claim 10, wherein the gateway is part of a gateway cluster that includes a scalable number of heterogeneous gateways, wherein the heterogeneous gateways are configured to perform gateway functions as defined by a 3rd Generation Partnership Project (3GPP) specification on a subset of established sessions.

15. The server of claim 10, wherein when the gateway was initialized, a disjoint subset of TEID and Internet Protocol addresses were provisioned by the gateway provisioning engine to the gateway.

16. A method comprising:
    initializing a gateway;
    assigning a range of tunnel endpoint identifiers (TEID) to the gateway, wherein the range of TEIDs are associated with the gateway;
    communicating the range of TEIDs to routers, wherein each TEID in the range of TEIDs is used to by the router to route packets to the gateway;
    receiving an initial message packet from a user equipment, wherein the initial message packet is part of a session;

communicating the initial message packet to a gateway provisioning engine, wherein the gateway provisioning engine creates a new gateway for the session;

assigning a new range of TEID to the new gateway, wherein the new range of TEIDs are associated with the new gateway;

communicating the new range of TEIDs to routers, wherein each TEID in the range of new TEIDs is used to by the router to route packets to the new gateway;

assigning, by the gateway provisioning engine, the session to the new gateway;

assigning, by the new gateway, a specific TEID for the session, wherein the specific TEID is included in new range of TEIDs and is associated with the new gateway; and communicating the specific TEID to the user equipment, wherein the TEID is configured to be used to route packets related to the session to the new gateway, wherein using the specific TEID and an Internet Protocol identifier assigned to the session, an evolved-Node B (eNodeB) is configured to communicate packets from the user equipment, directly to the new gateway assigned to the session and bypass mobility management entities and the gateway provisioning engine.

17. The method of claim 16, wherein the initial message packet includes a TEID that is equal to zero.

18. The method of claim 16, wherein the gateway is part of a gateway cluster that includes a scalable number of heterogeneous gateways.

19. The method of claim 16, wherein the gateway is part of a 3rd Generation Partnership Project (3GPP) network.

20. The method of claim 16, wherein the gateway is part of a gateway cluster that includes a scalable number of heterogeneous gateways, wherein the heterogeneous gateways are configured to perform gateway functions as defined by a 3rd Generation Partnership Project (3GPP) specification on a subset of established sessions.

21. A system for scaling mobile gateways in a 3rd Generation Partnership Project (3GPP) network, the system comprising:
    memory;
    one or more processors;
    means for initializing a gateway;
    means for assigning a range of tunnel endpoint identifiers (TEID) to the gateway, wherein the range of TEIDs are associated with the gateway;
    means for communicating the range of TEIDs to routers, wherein each TEID in the range of TEIDs is used to by the router to route packets to the gateway;
    means for receiving an initial message packet from a user equipment, wherein the initial message packet is part of a session;
    means for communicating the initial message packet to a gateway provisioning engine, wherein the gateway provisioning engine creates a new gateway for the session;
    means for assigning a new range of TEID to the new gateway, wherein the new range of TEIDs are associated with the new gateway;
    means for communicating the new range of TEIDs to routers, wherein each TEID in the range of new TEIDs is used to by the router to route packets to the new gateway;
    means for assigning, by the gateway provisioning engine, the session to the new gateway;
    means for assigning, by the new gateway, a specific TEID for the session, wherein the specific TEID is associated with the gateway; and
    means for communicating the specific TEID to the user equipment, wherein the TEID is configured to be used to route packets related to the session to the new gateway, wherein using the specific TEID and an Internet Protocol identifier assigned to the session, an evolved-Node B (eNodeB) is configured to communicate packets from the user equipment, directly to the new gateway assigned to the session and bypass mobility management entities and the gateway provisioning engine.

22. The system of claim 21, wherein the initial message packet includes a TEID that is equal to zero.

23. The system of claim 21, wherein the gateway is wherein the gateway is a servicing gateway (S-GW) or a packet data network gateway (P-GW).

24. The system of claim 21, wherein the gateway is part of a 3rd Generation Partnership Project (3GPP) network.

25. The system of claim 21, wherein the gateway is part of a gateway cluster that includes a scalable number of heterogeneous gateways, wherein the heterogeneous gateways are configured to perform gateway functions as defined by a 3rd Generation Partnership Project (3GPP) specification on a subset of established sessions.

* * * * *

UNITED STATES PATENT AND TRADEMARK OFFICE
CERTIFICATE OF CORRECTION

| | | |
|---|---|---|
| PATENT NO. | : 10,602,349 B2 | Page 1 of 1 |
| APPLICATION NO. | : 15/981658 | |
| DATED | : March 24, 2020 | |
| INVENTOR(S) | : Jacob Alden Cooper et al. | |

It is certified that error appears in the above-identified patent and that said Letters Patent is hereby corrected as shown below:

On the Title Page

In Column 2, Abstract, Line 7, delete "TEIDS" and insert -- TEIDs -- therefor.

In the Drawings

On Sheet 5 of 8, Figure 5, Line 4, delete "INITALIZE" and insert -- INITIALIZE -- therefor.

In the Claims

In Column 17, Line 41, in Claim 1, delete "TEIDS" and insert -- TEIDs -- therefor.

In Column 18, Line 23, in Claim 10, delete "TEIDS" and insert -- TEIDs -- therefor.

In Column 18, Line 31, in Claim 10, delete "TEIDS" and insert -- TEIDs -- therefor.

In Column 20, Lines 35-36, in Claim 23, delete "wherein the gateway is wherein the gateway is" and insert -- wherein the gateway is -- therefor.

Signed and Sealed this
Ninth Day of June, 2020

Andrei Iancu
*Director of the United States Patent and Trademark Office*